United States Patent
Timor et al.

(10) Patent No.: US 7,162,081 B2
(45) Date of Patent: Jan. 9, 2007

(54) METHOD AND APPARATUS FOR DETERMINING REGIONS OF INTEREST IN IMAGES AND FOR IMAGE TRANSMISSION

(75) Inventors: Kadir Timor, Oxford (GB); Paola Marcella Hobson, Alton (GB)

(73) Assignee: Motorola, Inc., Schaumburg, IL (US)

( * ) Notice: Subject to any disclaimer, the term of this patent is extended or adjusted under 35 U.S.C. 154(b) by 833 days.

(21) Appl. No.: 10/398,528

(22) PCT Filed: Oct. 9, 2001

(86) PCT No.: PCT/EP01/11715

§ 371 (c)(1),
(2), (4) Date: Apr. 8, 2003

(87) PCT Pub. No.: WO02/31766

PCT Pub. Date: Apr. 18, 2002

(65) Prior Publication Data

US 2004/0042656 A1    Mar. 4, 2004

(30) Foreign Application Priority Data

Oct. 9, 2000  (GB) ................ 0024669.4

(51) Int. Cl.
*G06K 9/00* (2006.01)

(52) U.S. Cl. ............ 382/168; 382/170; 382/190; 382/224

(58) Field of Classification Search ........ 382/124–127, 382/168, 170
See application file for complete search history.

(56) References Cited

U.S. PATENT DOCUMENTS

| | | | | |
|---|---|---|---|---|
| 4,922,915 | A * | 5/1990 | Arnold et al. ............... | 382/128 |
| 5,588,071 | A * | 12/1996 | Schultz ........................ | 382/168 |
| 5,982,917 | A * | 11/1999 | Clarke et al. ................ | 382/132 |
| 6,735,330 | B1 * | 5/2004 | Van Metter et al. ......... | 382/132 |
| 6,895,103 | B1 * | 5/2005 | Chen et al. .................. | 382/117 |

* cited by examiner

*Primary Examiner*—Joseph Mancuso
*Assistant Examiner*—Yuzhen Ge
(74) *Attorney, Agent, or Firm*—Valerie M. Davis

(57) ABSTRACT

A method and apparatus for ranking pixels in an image by degrees of saliency, including: defining (200, 210) a plurality of regions for each of a plurality of pixels in an image, where each of the regions for any one of the pixels at coordinates (x,y) has a different scale s, calculating (230) an entropy value for each of the regions, identifying (260) any of the regions as having a peak entropy value, weighting (270) the peak entropy value of each of the peak entropy regions by a weight value corresponding to a peak width estimate of the peak entropy value, and ranking (290) the regions by the weighted peak entropy values, thereby ranking the pixels. The invention can be included in a method and apparatus for image transmission, providing preferential transmission of salient portions of the image.

14 Claims, 7 Drawing Sheets

METHOD AND APPARATUS FOR DETERMINING REGIONS OF INTEREST IN IMAGES AND FOR IMAGE TRANSMISSION

This application claims the benefit of prior filed co-pending international application Serial No. PCT/EP01/11715 filed Oct. 9, 2001, and assigned to Motorola, Inc., which was published by the International Bureau on Apr. 18, 2002 under No. WO 02/31766.

FIELD OF THE INVENTION

The present invention relates generally to the field of image processing. More particularly, but not exclusively, the invention concerns methods and apparatus for determining regions of interest in images for transmission.

BACKGROUND OF THE INVENTION

There is a widening gap between demand for data transmitted via computer networks and available bandwidth. Similarly, there is a great demand for the transmission of data over digital radio links, for example to and from mobile radios and mobile 'phones. This has fueled the search for improved methods of data compression and more efficient transmission technologies.

Prior art transmission technologies that are particularly suited for video applications focus on interpreting image data at the transmission source, transmitting the interpretation data rather than the image itself, and using the interpretation data at the destination. The interpretation data may or may not be transmitted in compressed form.

Two alternative approaches to image interpretation are the 'image-driven', or bottom-up, approach, and the 'model-driven', or top-down, approach.

The image-driven approach relies on features in the image, such as edges or corners, to propagate "naturally" and form meaningful descriptions or models of image content. A typical example is figure-ground image segmentation, where the task is to separate the object of interest in the foreground from the background.

In the model-driven approach, information regarding content expectation is used to extract meaning from images. A typical example is object recognition where an outline Computer-Aided Design (CAD) model is compared to edges found in the image—an approach commonly used in manufacturing line inspection applications.

The key difference between the image driven and model driven approaches is in the feature grouping stage. In the image-driven approach, the cues for feature grouping come from the image, whereas in the model-driven approach the cues come from the comparison models.

In one variation of an image-driven approach, a number of small salient patches or 'icons' are identified within an image. These icons represent descriptors of areas of interest. In this approach saliency is defined in terms of local signal complexity or unpredictability, or, more specifically, the entropy of local attributes. Icons with a high signal complexity have a flatter intensity distribution, and, hence, a higher entropy. In more general terms, it is the high complexity of any suitable descriptor that may be used as a measure of local saliency.

Known salient icon selection techniques measure the saliency of icons at the same scale across the entire image. The scale to use for selection across the whole image may be chosen in several ways. Typically, the smallest scale at which a maximum occurs in the average global entropy is chosen. However, the size of image features varies. Therefore a scale of analysis that is optimal for a given feature of a given size might not be optimal for a feature of a different size.

There is therefore a need to further improve salient icon selection techniques.

SUMMARY OF THE INVENTION

The present invention discloses methods and apparatus for determining regions of interest in images. The present invention provides ways of extending the saliency measure to scale, and thereby finding features that exist at a very narrow range of scales. This yields salient icons having an optimum level of entropy.

In accordance with a preferred embodiment of the present invention, a method for ranking pixels in an image by degrees of saliency includes the steps of: defining a plurality of regions for each of a plurality of pixels in an image, where each of the regions for any one of the pixels at coordinates (x,y) has a different scale s; calculating an entropy value for each of the regions; identifying any of the regions as having a peak entropy value; weighting the peak entropy value of each of the peak entropy regions by a weight value corresponding to a peak width estimate of the peak entropy value; ranking the regions by the weighted peak entropy values, thereby ranking the pixels.

Further in accordance with a preferred embodiment of the present invention, the calculating step may include calculating a probability density function (PDF) estimate for the pixels within each of the regions. The calculating step may include calculating using a Parzen window PDF estimator.

Additionally, the calculating step may include calculating using histogram binning. The method may further include the step of applying a 3-tap averaging to the peak width estimate prior to performing the weighting step.

Further in accordance with a preferred embodiment of the present invention the weighting step may include weighting in accordance with a value W(x,y,s) according to the formula $$S(x,y,s) = H(x,y,s) \cdot W(x,y,s)$$

where $$W(x, y, s) = \sum_i |p_i(s) - p_i(s+1)| \cdot s$$

and H(x,y,s) is the entropy of region (x,y,s), and $p_i$ are discrete probabilities.

There is also provided in accordance with a preferred embodiment of the present invention a method for determining regions of saliency in an image, the method including the steps of a) defining a plurality of regions for each of a plurality of pixels in an image, where each of the regions for any one of the pixels at coordinates (x,y) has a different scale s, b) calculating an entropy value for each of the regions, c) identifying any of the regions as having a peak entropy value, d) weighting the peak entropy value of each of the peak entropy regions by a weight value corresponding to a peak width estimate of the peak entropy value, and e) for each selected one of the peak entropy regions f) selecting at least one neighboring region of peak entropy, g) determining the mean and variance of each of x, y, and s for the selected peak entropy region and the at least one neighboring region, and where the largest of the variances does not exceed a predetermined threshold, h) removing from the peak entropy regions any regions within a predetermined distance from the mean (x,y,s) point, and i) storing the mean values, thereby designating a region of interest.

Further in accordance with a preferred embodiment of the present invention the method further includes performing step e) in order of the weighted peak entropy values.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

The present invention extends prior art measures of saliency, so as to be able to compare the salience of both different spatial points and scales. The invention allows the selection of certain salient scales and salient spatial locations simultaneously. Inherent in this idea is that a feature may have a different saliency value at different scales. The invention allows a direct comparison of these.

Most multi-scale approaches to signal processing fall into two main categories. Schemes in the first category attempt to capture the multi-scale nature of signals by processing a complete multi-scale representation of the signal. Schemes in the second category attempt to find a best scale or set of scales to represent the signal, often parsing a complete multi-scale representation in order to choose the particular scale(s) of interest. The invention is a development in the general area of the second these two approaches.

Icon Scale Selection and Calculating Saliency Values

The method of the invention is best explained by considering the behaviour of the entropy scale metric with varying scale parameter.

Figure 1A:
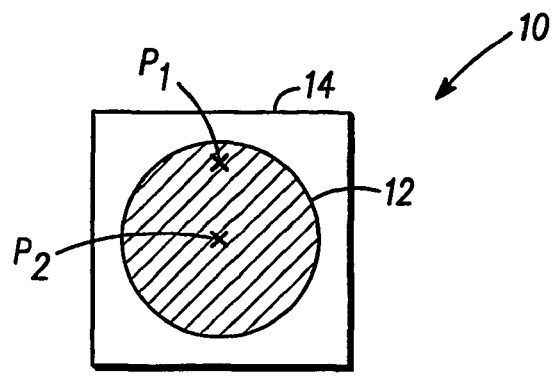
FIG. 1A is a simplified illustration of an exemplary icon 10, useful in understanding the present invention.
Figure 1B:
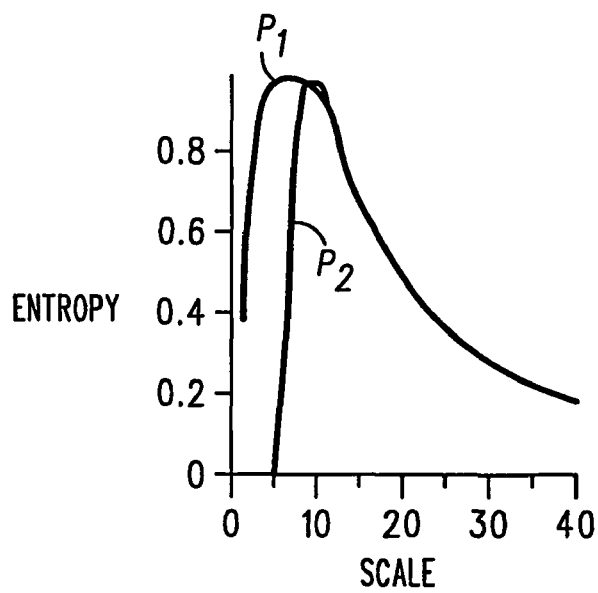
FIG. 1B is a simplified graphical illustration of an entropy analysis for points $P_1$ and $P_2$ of FIG. 1A, useful in understanding the present invention.

The problem of scale selection may be seen with reference to FIG. 1A and FIG. 1B. FIG. 1A is a simplified illustration of an exemplary icon 10. FIG. 1B is a simplified graphical illustration of an entropy analysis for points $P_1$ and $P_2$.

In FIG. 1A, icon 10 is illustrative of a feature within an image. The feature is shown as a circle for purposes of illustration. In a real image, features clearly may be radically different in shape from this idealised case.

Considering FIG. 1A, icon 10 is shown comprising a circle 12 in which two points $P_1$ and $P_2$ are indicated at the edge and center of circle 12 respectively. The whole of circle 12, including points $P_1$, and $P_2$, is to be understood as being an entirely black icon/feature on the image. However, FIG. 1A shows the area within circle 12 as a hatched region, in order that the locations of points $P_1$, and $P_2$ can be recognised on the figure.

A square 14 around circle 12 represents the bounding square for the scale at which the peak in entropy for icon 10 occurs, when taken about point $P_2$. This entropy peak is illustrated in FIG. 1B as the maximum in the entropy plot marked $P_2$.

There is clearly a maximum in both plots P1 and P2, for points $P_1$ and $P_2$ respectively, in FIG. 1B. It would not be clear which of $P_1$ and $P_2$ would be most salient based on peak entropy alone, as both $P_1$ and $P_2$ have peak entropy values, albeit at different scales. Thus, both plots would appear to be equally useful in determining the appropriate scale.

However, it may also be seen in FIG. 1B that the two plots for entropy versus scale have different peak widths. In FIG. 1B the plot for $P_1$ is approximately twice as wide as that for $P_2$. It is commonly assumed that a feature that is present across a large number of scales is particularly salient. However, as described above, saliency is based on complexity, defined in terms of unpredictability. In real-life images this exists at a small number of scales and spatial locations, and hence is considered to be relatively rare. If an image was complex and unpredictable at all spatial locations and scales, then it would either be a random image or fractal-like. Hence, in FIG. 1B the peak of $P_2$ is actually of greater salience than that of $P_1$. It should be noted that a given point may have several peaks of entropy, each at a different scale.

This analysis of FIG. 1B indicates that the width of the entropy plot taken about different points on an image might serve as a useful indicator. Notably, a saliency estimate based on peak height alone does not enable a distinction to be made between the two plots on FIG. 1B.

Figure 2:
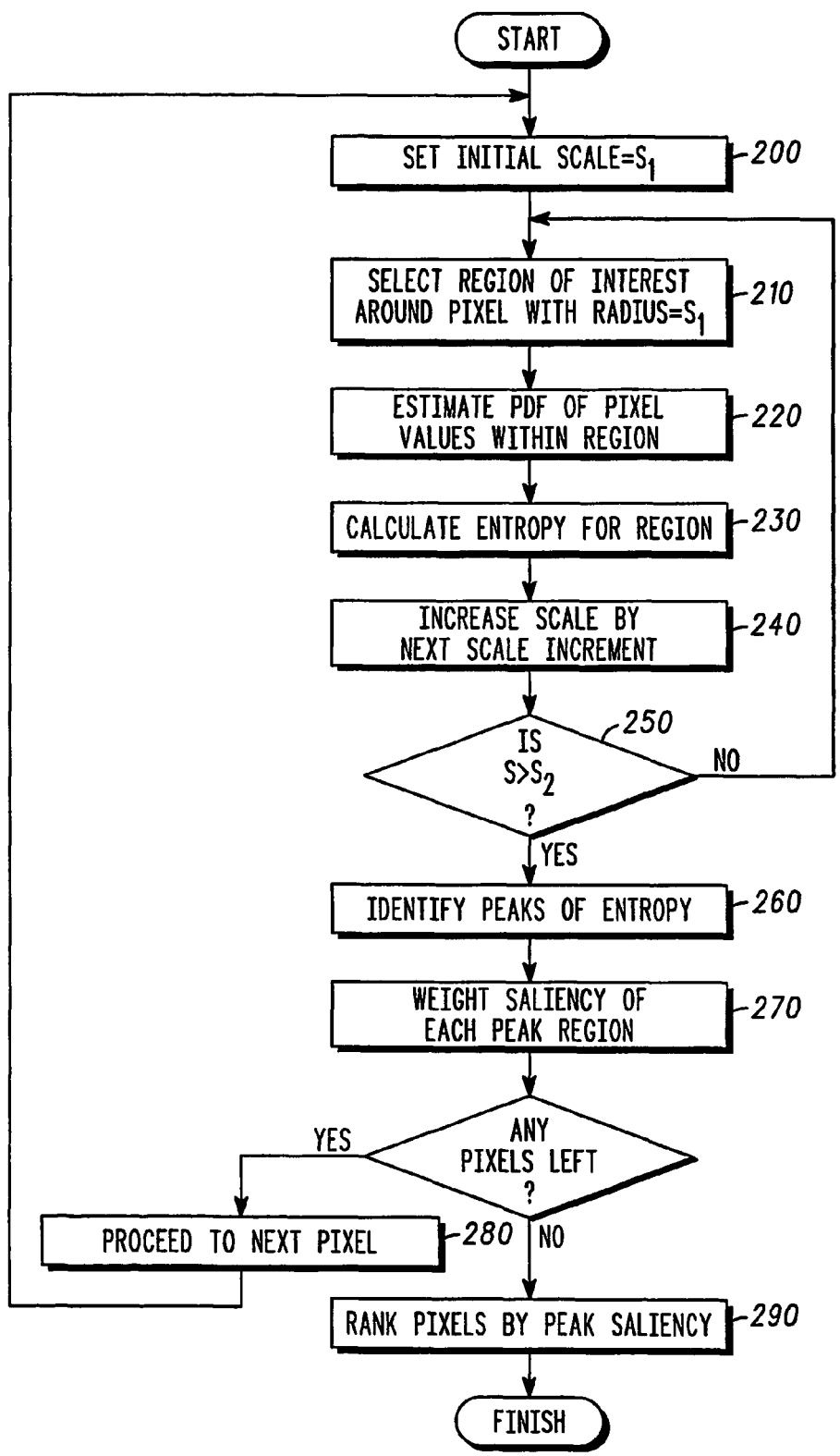
FIG. 2 is a simplified flowchart illustration of a method for determining icon salience, operative in accordance with a preferred embodiment of the present invention.

Reference is now made to FIG. 2, which is a simplified flowchart illustration of a method for determining icon salience, operative in accordance with a preferred embodiment of the present invention.

In the method of FIG. 2, a circular region of a radius s, typically initialized to a minimum scale value $s_1$ (step 200), is defined around a pixel at coordinates (x,y) in an image (step 210). The probability density function (PDF) of the values of the pixels within the region is then estimated (step 220). The values may be gray level intensity values, color levels, or any other characteristic used to define the type of interest desired for image features. A Parzen window PDF estimator is preferably used where a pre-defined kernel is placed on the data points in the sample set. The PDF estimation is then the sum of all kernels across the data axis. A Gaussian kernel is preferably used for its mathematical tractability and resulting smooth PDF estimate, where the sigma controls the degree of smoothing applied to the PDF estimate. Since there is no arbitrary binning, the entropy value is stable under linear intensity shifts.

A basic histogram binning method may be used as an alternative to the Parzen window PDF estimation algorithm. In this method, instead of placing a kernel (e.g., a Gaussian kernel) on each data point and then summing all the kernels to calculate the PDF estimate, the data axis is simply divided into a number of bins, for example 16 or 32 bins, with each bin having upper and lower data values. A count for each bin is kept and is incremented for every pixel within the local window that is between the upper and lower data values for that bin.

Once the PDF is calculated, the entropy H of region (x,y,s) is then calculated (step 230) using the formula:

$$H(x, y, s) = -\sum_i p_i(\log(p_i))$$

where $p_i$ are the discrete probabilities, and $0 < p_i <= 1$.

Radius s is then increased by the next scale increment (step 240), and the previous steps are repeated for all scales of s between $s_1$ and a maximum scale value $s_2$ (step 250). Once the entropy has been calculated for all regions between $s_1$ and $s_2$ for pixel (x,y), those regions having a peak entropy relative to the entropy of the immediately preceding and succeeding regions are determined (step 260).

The entropy H of each peak region is then weighted in accordance with a value W(x,y,s) which is proportional to its peak width estimate (step 270), in order to provide a measure of saliency S using the formula $$W(x, y, s) = \sum_i |p_i(s) - p_i(s+1)| \cdot s$$

where $s(x,y,s) = H(x,y,s) \cdot W(x,y,s)$

Steps 200–270 are then preferably repeated for all pixels in the image (step 280). Once the entropy values of regions of peak entropy have been weighted, they are preferably ranked by weighted peak entropy value, thus resulting in a ranking of the pixels by peak saliency (step 290).

The method of the invention is novel due to the use of peak width as a weighting factor in the calculation of saliency. However, the actual technique selected for peak width estimation represents a further refinement of the broad idea of using the peak width.

The inventors have chosen a technique for peak width estimation that involves calculating the sum of absolute gradients of the histogram measured at the peak. The histogram meant here is an approximation to the continuous probability density function (PDF) of the intensity distributions around the points such as P1 and P2 in FIG. 1A. If the sum is large, this indicates that the peak in the intensity distribution, see FIG. 1B, is quite sharp. A small value of the sum indicates that the peak is likely to be quite wide. The advantage of this Sum of Absolute Difference calculation is that it avoids particular cases that have to be dealt with separately for a simple measurement of peak width. These particular cases would slow down the computation if the inventors had chosen to perform a simple measurement of peak width. The Sum of Absolute Differences calculation is therefore robust, and does not suffer significant delays in the computation.

The Sum of Absolute Differences calculation is the calculation referred to above with the formula:

$$W(x, y, s) = \sum_i |p_i(s) - p_i(s+1)| \cdot s$$

W is thus the sum of absolute differences, weighted by the scale s.

A simple 3-tap averaging may be applied to the peak width estimation prior to weighting the entropy value in order to increase the robustness to noise. Once the weighting value has been calculated, the value W(x,y,s) proportional to peak width estimate at each scale s is replaced with the average of the values at s−1, s, and s+1. That average is (W(x,y,s−1)+W(x,y,s)+W(x,y,s+1))/3

At the minimum and maximum scales this operation would typically not be carried out.

Region Selection and Clustering

It is advantageous to robustly pick single points of entropy maxima. This relies on the persistence of these points in various imaging conditions, such as noise or small amounts of motion. It is known that the presence of noise in an image acts as a randomizer and generally increases the entropy value, affecting low entropy values more than high entropy values. However, the effect of noise also depends greatly on the shape of the local entropy surface around the maximum. Since the maximum point of a narrow peak is less affected by noise than that of a broad peak, the robustness of picking single points of entropy maxima then relies on the sharpness of the peak.

The shape of the entropy surface is dependent on three main factors: the original image intensity surface, the shape of the sampling window or Region Of Interest (ROI) and the size of the ROI (scale). The shape of the ROI is circular as this allows the entropy value to be rotationally invariant The dependence on the image surface is a result of a mismatch between the sampling ROI size and/or shape and the image feature of interest. Assuming that the scale is adjusted correctly, and that the shape of the ROI is fixed, it follows that this dependence is not controllable, and that picking single points in entropy space is not a robust method.

Figure 3:
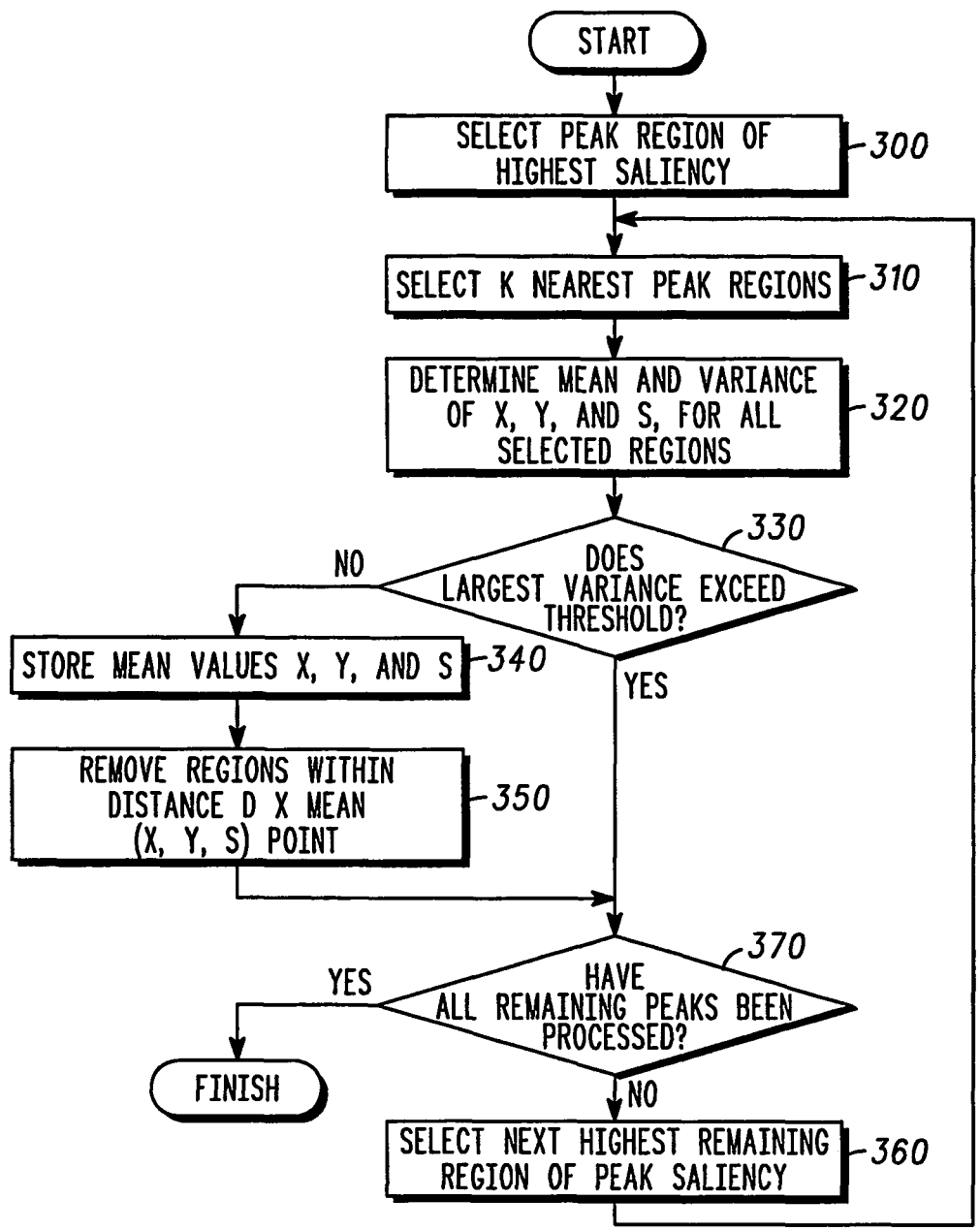
FIG. 3 is a simplified flowchart illustration of a method for selecting salient regions, operative in accordance with a preferred embodiment of the present invention.

A more robust method would be to pick regions rather than points in entropy space. Although the individual pixels within a salient region may be affected by the noise at any given instant, it is unlikely to affect all of them such that the region as a whole becomes non-salient Reference is now made to FIG. 3. FIG. 3 is a simplified flowchart illustration of a method for selecting salient regions, operative in accordance with a preferred embodiment of the present invention.

In the method of FIG. 3, only the regions of peak entropy as determined in FIG. 2 are processed. The processing of these regions is as follows.

The peak region (x,y,s) of highest saliency, as determined by the method of FIG. 2, is selected (step 300). The peak itself (x,y,s) is defined by the region's center point.

The K nearest peak regions are then selected (step 310). Nearness may be defined in (x,y,s) space based on a sum of the squares of the vector distance $(x^2+y^2+s^2)$. The value of K determines the noise robustness of the features being detected. A higher K value will result in larger regions with well specified properties being detected, for example an automobile in the image. A smaller K value allows features of finer detail to be detected, for example a car antenna in the image. K is preferably adapted until a predefined variance threshold is exceeded.

Once the K peak regions have been determined for the selected peak region, the mean and variance of x, y, and s are calculated for all the selected regions (step 320). The largest of the three variances is then compared with a threshold. The value of the threshold may be set in accordance with known clustering algorithms, typically 0.7 (step 330). A variance that is less than the threshold typically indicates that the regions are well clustered, in which case the mean values of x, y, and s are then stored (step 340).

Those of the K regions that are within a distance D multiplied by the mean(s) from the mean (x,y,s) point are then removed from the list of peak regions of saliency created by the method of FIG. 2 (step 350). D may be set to be any value or preferably an adaptive value related to the variance, such as a value proportional to 3× standard deviation.

A variance (step 330) that is greater than the threshold typically indicates that no clustering is found, in which case the point may be stored as an isolated point, the value of K may be reduced until clustering is attained, possibly down to a single point, or else the point may simply remain in the list of salient points to see if it clusters in with anything else (step 370).

Steps 300–350 are then performed on the next highest remaining region of peak entropy (step 360) until all regions of peak entropy have been processed, preferably in order of weighted peak entropy value.

The present clustering method thus accounts for the impact of noise on the saliency calculation of FIG. 2, and gives consideration to points of high entropy that are highly correlated in saliency space.

If the regions are point regions, then the variance may be zero. Where only two regions are used in the calculation, the variance calculation may be discarded.

Figure 4:
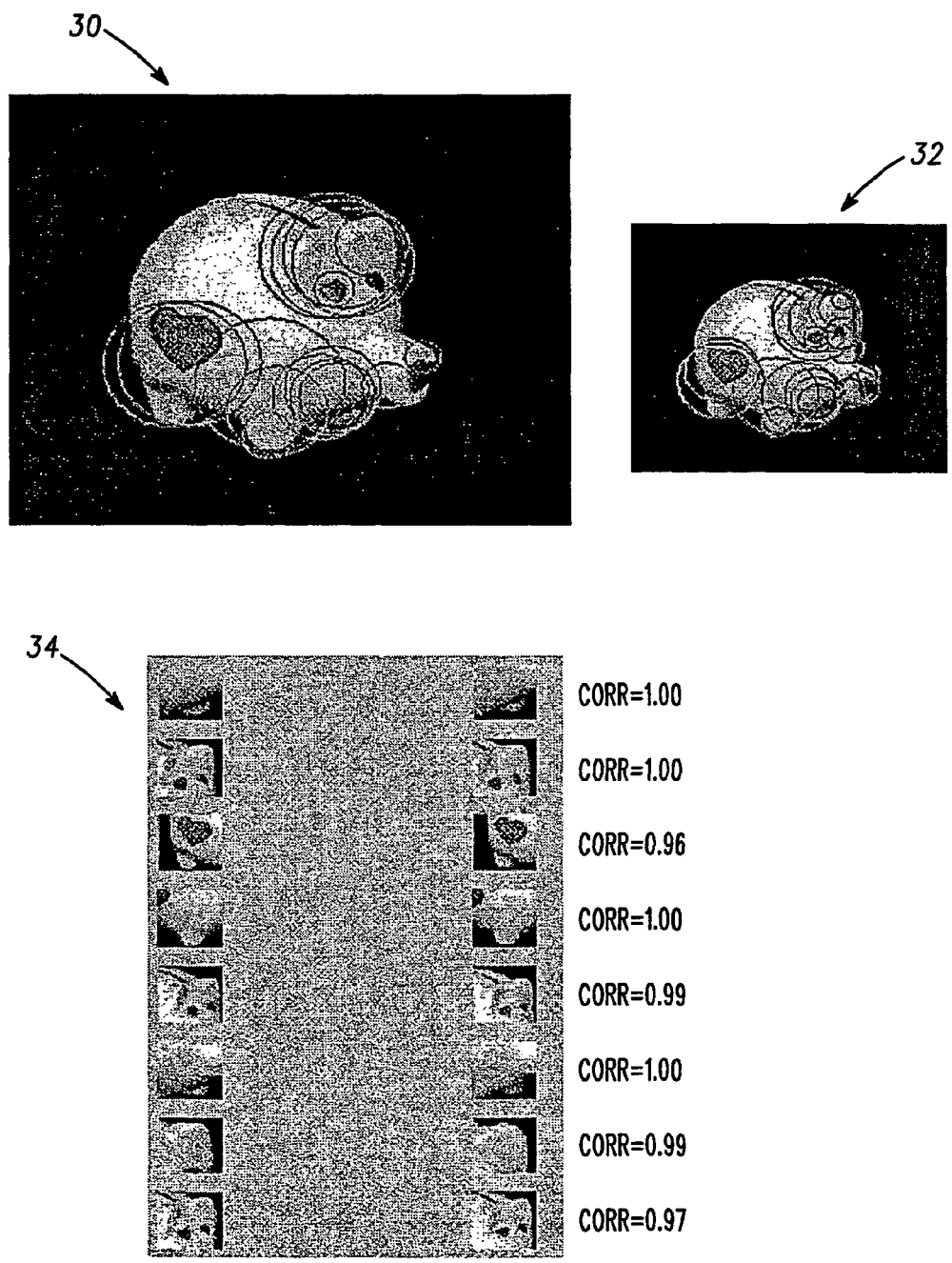
FIG. 4 is a simplified pictorial illustration showing the results of an implementation of the method of FIGS. 2 and 3.

FIG. 4 shows the results of an implementation of the method of FIGS. 2 and 3. In FIG. 4, salient icons have been matched between the two images 30 and 32, using the method of the invention. In the implementation, salient regions and scales have been selected in two the images 30 and 32. The icons have been correlated, at 34, to find the best matching icons between the two images.

Preprocessing stages may be used to reduce noise in the original image prior to carrying out the methods described herein. Diffusion methods are widely known for their noise reduction and smoothing properties, and are widely cited as useful for generating scale-space representations of the original signal. Scale space methods attempt to represent the original signal at a number of scales by successive smoothing operations. Although linear diffusion, which is equivalent to smoothing with a Gaussian filter, is considered to provide the most general smoothing, experimentation has shown that non-linear isotropic diffusion and non-linear anisotropic diffusion are preferable. Non-linear isotropic diffusion and non-linear anisotropic diffusion methods adjust the smoothing such that predefined significant edges are not smoothed. In non-linear isotropic diffusion, the smoothing is weighted by a local gradient function. In non-linear anisotropic diffusion, the smoothing is also directed to the direction of edges. Non-linear anisotropic diffusion also removes noise at edges.

Image Transmission Method

The present invention also comprises a method of image transmission. This method of image transmission comprises the methods explained above.

In particular, the methods of ranking pixels and of determining saliency in an image provide a way of identifying important regions of an image. Such identification can be used to identify parts of an image that are then transmitted preferentially.

For example, an image may be transmitted over a radio link, to or from a mobile radio (PMR) or a mobile telephone. The bandwidth of the radio link available may restrict substantially the amount of data that can be transmitted from an image. The highly ranked pixels or most salient regions may be transmitted more often than other data. In fact, these may be the only portions of an image that are transmitted, for example during periods when an image changes rapidly with time.

Apparatus

The invention has been described above in terms of a method. However, the invention also comprises devices functioning in accordance with the invention.

Figure 5:
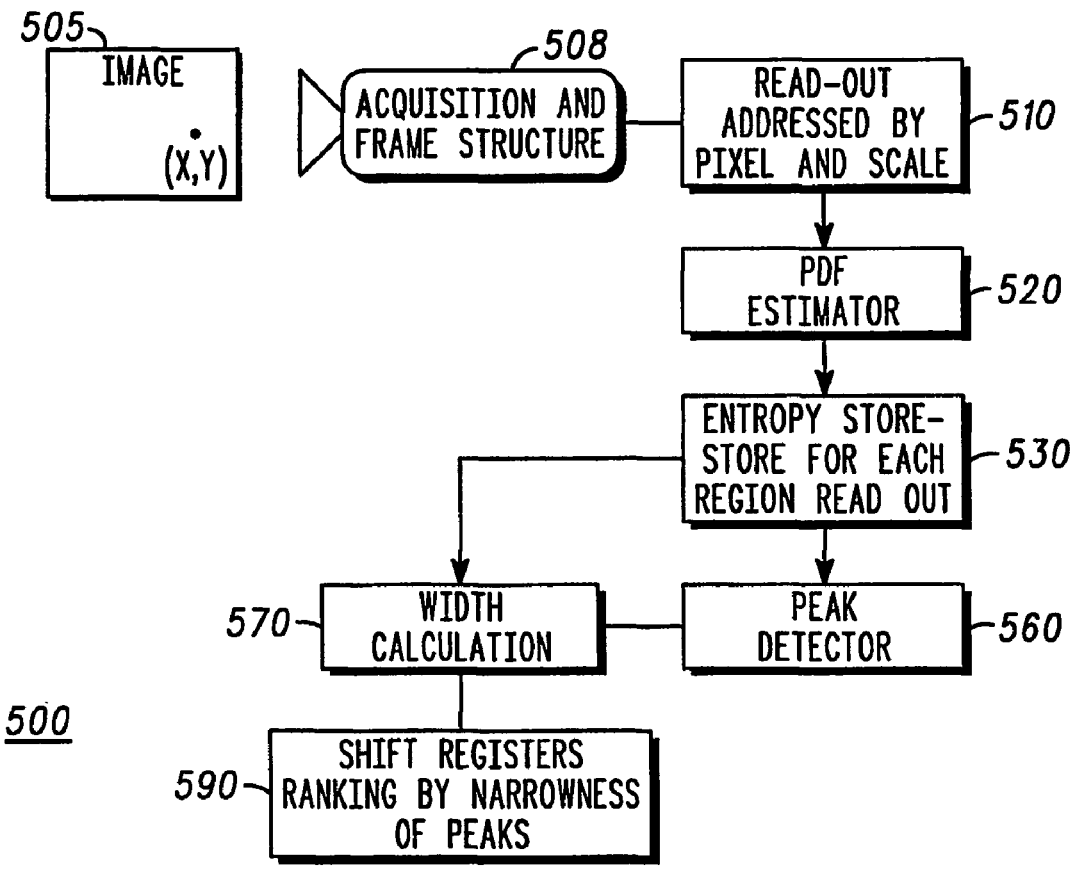
FIG. 5 illustrates a device for ranking pixels in an image by degrees of saliency, in accordance with an embodiment of the invention.

An embodiment of such a device is illustrated in appended FIG. 5. The device (500) of FIG. 5 serves to rank pixels in an image by degrees of saliency. The device comprises:

a) means (510) for defining a plurality of regions for each of a plurality of pixels in an image (505), each of the regions having a different scale s for any one of said pixels at coordinates x,y, b) means (530) for calculating an entropy value for each of the regions;

c) means (560) for identifying any peak entropy regions, the peak entropy regions being regions that include a peak entropy value;

d) means (570) for weighting the peak entropy value of each of the peak entropy regions by a weight value corresponding to a peak width estimate of the peak entropy value;

e) means (590) for ranking the regions by the weighted peak entropy values, thereby ranking the pixels.

Also shown in FIG. 5 is an 'acquisition and frame structure' unit 508, which includes a camera for scanning the image. Such a unit is known to the person skilled in the art, and hence is not described in further detail. The PDF estimator 520 provides the probability density function, as described above with reference to the methods of the invention.

The invention also extends to an image transmission device. The image transmission device comprises a device as explained above, and generally explained in connection with FIG. 5. The image transmission device may select salient regions of an image for preferential transmission. Particularly where the transmission is over a radio link to or from a mobile or portable radio (PMR) or mobile telephone, the transmission may comprise the selected regions only, or these regions may be transmitted more frequently than other regions.

The image transmission device may form part of a mobile or portable radio (PMR) or mobile telephone.

Different Feature Mans

In the basic method and apparatus of the invention, we have used the local distribution of intensity values as the descriptor for saliency. The invention is however not restricted to this. Any suitable feature map for the particular task at hand may be used.

Figure 6:
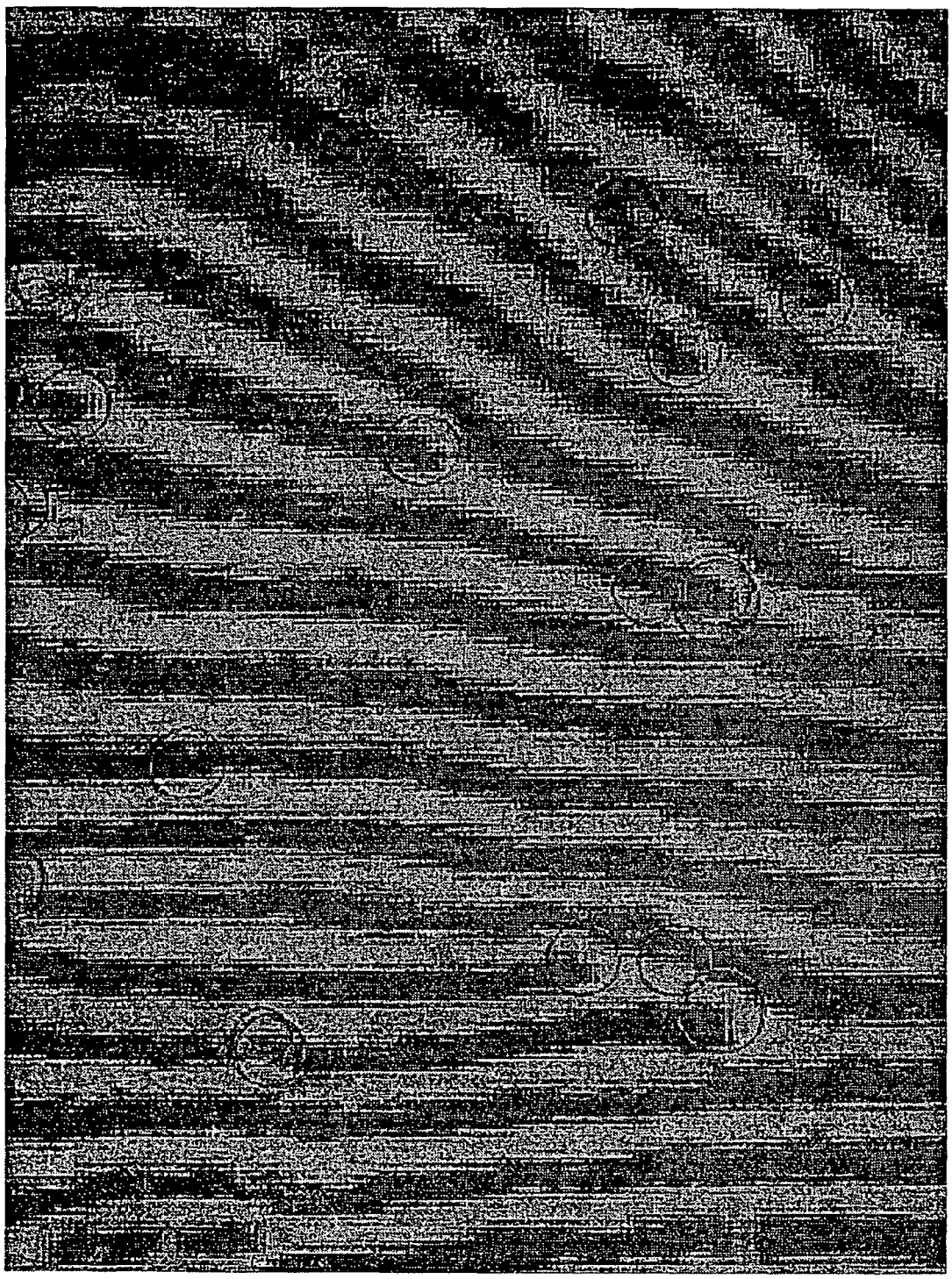
FIGS. 6 and 7 illustrate applications of the invention to the recognition of salient features and scales in fingerprint images.
Figure 7:
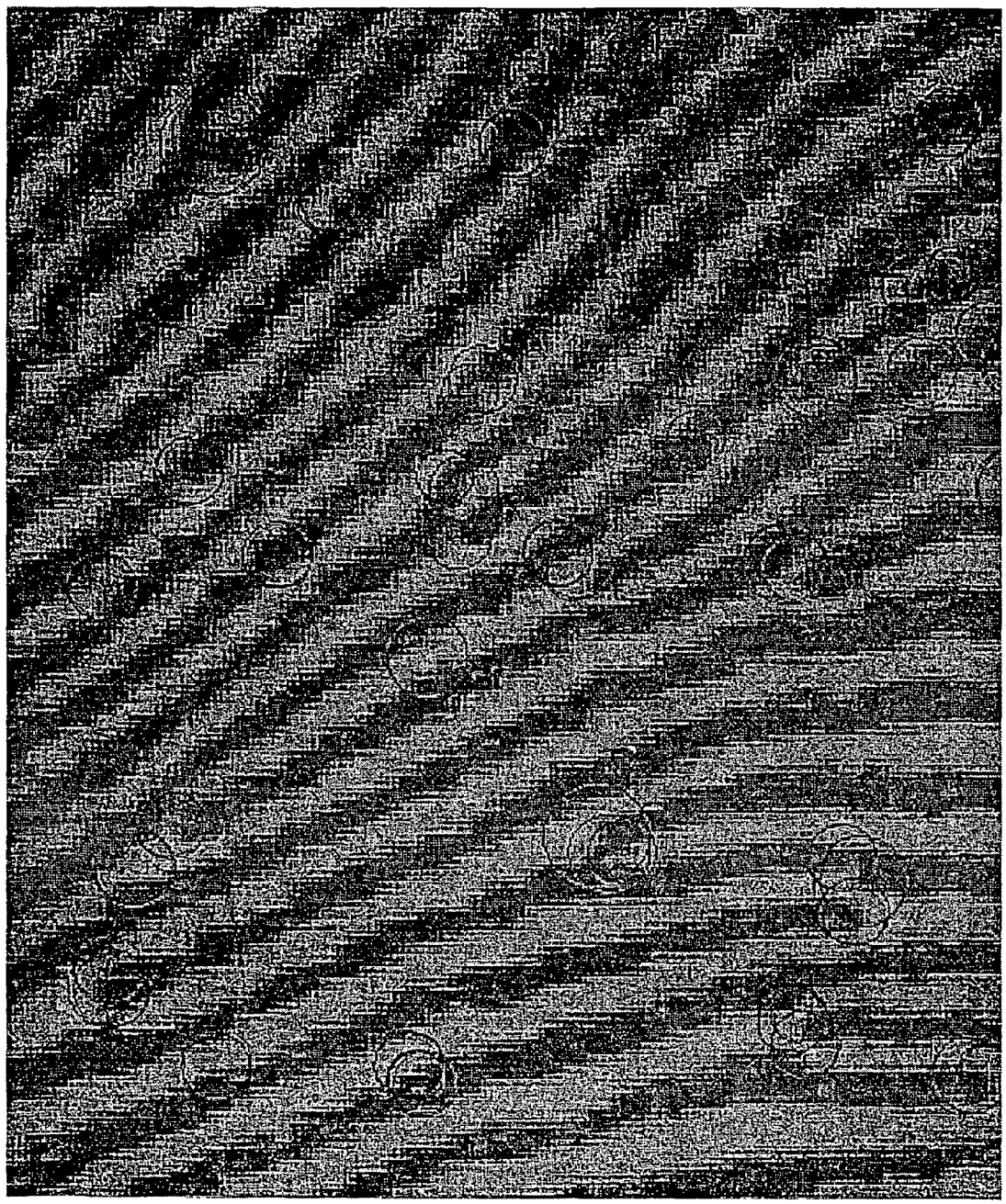

For example, in performing an analysis of fingerprint images, bifurcations and end-points of the ridges are commonly considered to be salient. For this task we use an edge direction feature map. The non-salient parts are those that consist of lines at a single scale and a single dominant direction. Bifurcations and end-points consist of many edge directions, and possibly scales. Instead of using the PDF of intensity values, we use the PDF of edge directions and scales. FIG. 6 shows the most salient parts, and their respective scales, of a fingerprint image found using this method. See also FIG. 7.

Thus the method and apparatus of the invention can use any suitable feature map in the determination of saliency.

Matching Salient Regions

Matching is a very common operation necessary in many computer vision tasks. For example, in object recognition the appropriate model from the object database must be found. This is commonly done by exhaustively attempting to test the match between all models in the database and the image features.

The saliency method of the present invention can improve the performance of such tasks by reducing the amount of data that needs to be stored for each model. This therefore reduces the complexity of the model search. It does this is two mains ways:

(i) It reduces the number of descriptors that need to be stored. Only the salient regions are described.

(ii) The respective scales for each salient region are stored. Hence the dimensionality of the search space is reduced. This is because we know the scale of the salient bits, so there is no need to try out many scales between the model and the image.

The appropriate descriptor for the task should be chosen such that it is more powerful (or descriptive) than the one used for the saliency feature map. In the matching examples shown in FIG. 4, we have used the vector of pixel values directly. This can be considered as a very powerful descriptor.

In some applications it may be more appropriate to use less discriminating descriptors such as high-dimensional statistical or geometric invariants. These might provide benefits such as rotational or photometric invariance.

Once the salient regions have been selected, they may be used in a matching task.

The methods and apparatus disclosed herein have been described in a manner sufficient to enable persons of ordinary skill in the art to readily adapt commercially available hardware and software as may be needed to reduce any of the embodiments of the present invention to practice without undue experimentation and using conventional techniques.

While the present invention has been described with reference to a few specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true scope of the invention.

The invention claimed is:

1. A method for ranking pixels in an image by degrees of saliency, the method comprising the steps of;
   a) defining a plurality of regions for each of a plurality of pixels in an image, wherein each of said regions, for any one of said pixels at coordinates (x,y), has a different scale s;
   b) calculating an entropy value for each of said regions;
   c) identifying any peak entropy regions, the peak entropy regions being regions which include a peak entropy value;
   d) weighting said peak entropy value of each of said peak entropy regions by a weight value corresponding to a peak width estimate of said peak entropy value; and
   e) ranking said regions by said weighted peak entropy values, thereby ranking said pixels.

2. A method according to claim 1 wherein said calculating step b) comprises calculating a probability density function (PDF) estimate for said pixels within each of said regions.

3. A method according to claim 2 wherein said calculating step b) comprises calculating using a Parzen window PDF estimator.

4. A method according to claim 2 wherein said calculating step b) comprises calculating using histogram binning.

5. A method according to claim 1 and further comprising the step of applying a 3-tap averaging to said peak width estimate prior to performing said weighting step d).

6. A method according to claim 1 wherein said weighting step d) comprises weighting in accordance with a value W(x,y,s) according to the formula S(x,y,s)=H(x,y,s)·W(x,y,s) where $$W(x, y, s) = \sum_i |p_i(s) - p_i(s+1)| \cdot s$$

and H(x,y,s) is the local entropy.

7. A method for determining regions of saliency in an image, the method comprising the steps of:
   a) defining a plurality of regions for each of a plurality of pixels in the image, wherein each of said regions for any one of said pixels at coordinates (x,y) has a different scale s;
   b) calculating an entropy value for each of said regions;
   c) identifying any of said regions as having a peak entropy value;
   d) weighting said peak entropy value of each of said peak entropy regions by a weight value corresponding to a peak width estimate of said peak entropy value; and
   e) for each selected one of said peak entropy regions:
      i) selecting at least one neighboring region of peak entropy;
      ii) determining the mean and variance of each of x,y, and s for said selected peak entropy region and said at least one neighboring region; and
      where the largest of said variances does not exceed a predetermined threshold:
      iii) removing from the set of said peak entropy regions any regions within a predetermined distance from said mean (x,y,s) point; and
      iv) storing said mean values, thereby designating a region of interest.

8. A method according to claim 7 and further comprising performing step e) in order of said weighted peak entropy values.

9. A method according to claim 7, wherein the regions are point regions and the variance is zero.

10. A method according to claim 7, wherein there are only two regions, and the variance calculation is discarded.

11. A method of image transmission, comprising the steps of:
   a) defining a plurality of regions for each of a plurality of pixels in an image, wherein each of said regions, for any one of said pixels at coordinates (x,y), has a different scale s;
   b) calculating an entropy value for each of said regions;
   c) identifying any peak entropy regions, the peak entropy regions being regions which include a peak entropy value;
   d) weighting said peak entropy value of each of said peak entropy regions by a weight value corresponding to a peak width estimate of said peak entropy value; and
   e) ranking said regions by said weighted peak entropy values, thereby ranking said pixels.

12. A method of image transmission, comprising the steps of:
- a) defining a plurality of regions for each of a plurality of pixels in the image, wherein each of said regions for any one of said pixels at coordinates (x,y) has a different scale s;
- b) calculating an entropy value for each of said regions;
- c) identifying any of said regions as having a peak entropy value;
- d) weighting said peak entropy value of each of said peak entropy regions by a weight value corresponding to a peak width estimate of said peak entropy value; and
- e) for each selected one of said peak entropy regions:
  - i) selecting at least one neighboring region of peak entropy;
  - ii) determining the mean and variance of each of x,y, and s for said selected peak entropy region and said at least one neighboring region; and
  - where the largest of said variances does not exceed a predetermined threshold:
  - iii) removing from the set of said peak entropy regions any regions within a predetermined distance from said mean (x,y,s) point; and
  - iv) storing said mean values, thereby designating a region of interest.

13. A device for ranking pixels in an image by degrees of saliency, comprising;
- a) means for defining a plurality of regions for each of a plurality of pixels in an image, each of said regions having a different scale s for any one of said pixels at coordinates x,y;
- b) means for calculating an entropy value for each of said regions;
- c) means for identifying any peak entropy regions, the peak entropy regions being regions that include a peak entropy value;
- d) means for weighting said peak entropy value of each of said peak entropy regions by a weight value corresponding to a peak width estimate of said peak entropy value;
- e) means for ranking said regions by said weighted peak entropy values, thereby ranking said pixels.

14. An image transmission device comprising a device for ranking pixels in an image by degrees of saliency, the device for ranking pixels comprising;
- a) means for defining a plurality of regions for each of a plurality of pixels in an image, each of said regions having a different scale s for any one of said pixels at coordinates x,y;
- b) means for calculating an entropy value for each of said regions;
- c) means for identifying any peak entropy regions, the peak entropy regions being regions that include a peak entropy value;
- d) means for weighting said peak entropy value of each of said peak entropy regions by a weight value corresponding to a peak width estimate of said peak entropy value;
- e) means for ranking said regions by said weighted peak entropy values, thereby ranking said pixels.

* * * * *

UNITED STATES PATENT AND TRADEMARK OFFICE
CERTIFICATE OF CORRECTION

PATENT NO. : 7,162,081 B2 Page 1 of 1
APPLICATION NO. : 10/398528
DATED : January 9, 2007
INVENTOR(S) : Kadir et al.

It is certified that error appears in the above-identified patent and that said Letters Patent is hereby corrected as shown below:

Title Page items # 12 & 75
Please change the first inventor name from "KADIR TIMOR" to --TIMOR KADIR--

Please change "Timor, et al." to --Kadir, et al.--

Signed and Sealed this

Sixteenth Day of October, 2007

JON W. DUDAS
*Director of the United States Patent and Trademark Office*